Sharp & Seymour.

Suspender.

No. 4,348. Reissued Apr. 18, 1871.

Witnesses,
Harry King
Phil. T. Dodge

Inventors,
James B. Sharp &
Robert M. Seymour
by Dodger & Munn
Attys.

N. PETERS, PHOTO-LITHOGRAPHER, WASHINGTON, D. C.

United States Patent Office.

JAMES B. SHARP, OF NEW YORK, AND WILLIAM SEYMOUR, (ADMINISTRATOR OF ROBERT M. SEYMOUR, DECEASED,) OF SING SING, NEW YORK.

Letters Patent No. 59,465, dated November 6, 1866; reissue No. 4,348, dated April 18, 1871.

IMPROVEMENT IN SUSPENDERS.

The Schedule referred to in these Letters Patent and making part of the same.

*To all whom it may concern:*

Be it known that JAMES B. SHARP and ROBERT M. SEYMOUR, of New York, in the county of New York and State of New York, did invent certain new and useful Improvements in Suspenders; and we do hereby declare that the following is a full, clear, and exact description thereof, reference being had to the accompanying drawing making part of this specification, and to the letters of reference marked thereon, like letters indicating like parts wherever they occur.

To enable others skilled in the art to construct and use said invention we will proceed to describe it.

This invention relates to improvements in the construction of suspenders; and

The invention consists—

First, in uniting or securing the straps by means of metallic fastenings; and

Second, in the protection of the ends of the straps by metallic binding, as hereinafter more fully explained.

Figure 6:
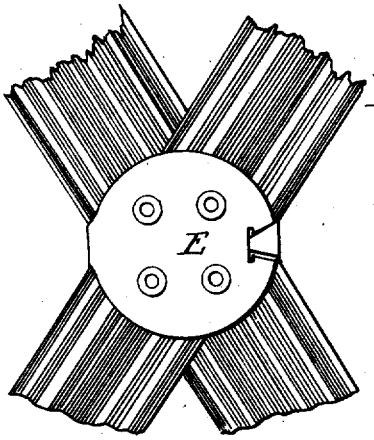
Figure 7:
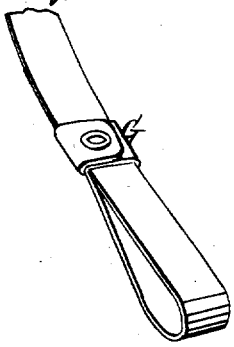

Figures 1, 2, 3, 4, and 5 are views showing the application of the metallic bindings to the ends of the straps;

Figure 6 represents the main straps secured to each other by metallic fastenings; and Figure 7 shows a portion of one of the supplemental or button-straps, secured by a metallic clip.

It has heretofore been customary in the manufacture of suspenders to bind the ends of the straps, both large and small, with cloth or leather stitched thereon, and also to fasten the main straps together by sewing or stitching, and likewise to secure the button or supplemental straps to their buckles, slides, or loops in the same manner.

The object of this invention is to dispense with the sewing or stitching, and to substitute therefor metallic binding, and also metallic fastenings, thereby enabling them to be made cheaper, stronger, and more durable.

The binding consists of a thin piece of brass or other suitable sheet-metal, cut of the proper size, and doubled so as to fit over the end of the strap.

Figure 1:
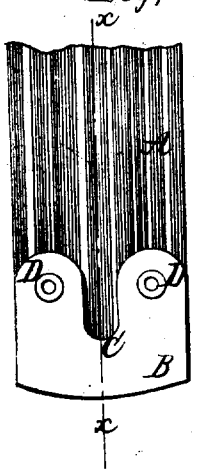
Figure 5:
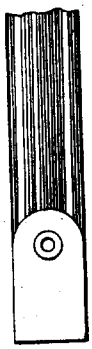
Figure 2:
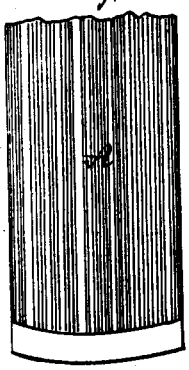
Figure 3:
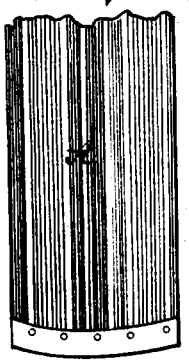
Figure 4:
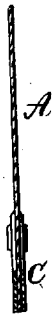

This binding B may be made in the form of a narrow strip, as shown in figs. 2 and 3; or it may be made larger and of any ornamental shape, as indicated in figs. 1, 4, and 5, and may be curved lengthwise to fit the end of the strap to which it is to be applied.

The binding is secured to the strap A by simply compressing it firmly thereon, as shown in fig. 2, or by pins or rivets, as represented in fig. 3, or by eyelets, as shown in figs. 1 and 4, although it is not intended to limit the invention to any special method of fastening the binding to the strap; this portion of the invention consisting of the application of the metallic binding, without reference to the special method of securing it in place.

At the point where the main straps intersect or are connected to each other they are fastened by a metallic plate or clip of any suitable form or construction.

In fig. 6 is shown a metal plate, E, cut in the form of a disk, with an adhering arm or point, which is long enough to fold around on the opposite side of the straps, and have its end, which is pointed, stuck through a slit cut in the plate, as there represented.

Eyelets are also represented as being used to secure the plate E more firmly to the straps; but these may or may not be used—the necessity for their use depending upon the form and manner of applying the metallic plate or fastening.

The supplemental or button-straps, after being passed through the buckle, slide, or loop, are doubled back on themselves or upon each other, (according to the manner of using them,) and then have their ends fastened by means of metallic clip G, as represented in fig. 7, in which case the clip consists of a thin strip of sheet metal bent around the two folds or thicknesses of the strap and secured by an eyelet or rivet.

It is, however, obvious that the clasp or fastening may be made of any suitable form and secured in any proper manner, the object being to secure the folded end firmly in position. By these means all sewing or stitching is dispensed with, and the manufacture of the article greatly cheapened and improved.

Having thus described the invention,

What is claimed as the invention of said SHARP and SEYMOUR, is—

1. The improved suspenders, having their straps rigidly secured by metallic fastenings, substantially as described.

2. Suspenders having their ends covered with metallic bindings, substantially as set forth.

JAMES B. SHARP.
WILLIAM SEYMOUR,
*Administrator of* ROBERT M. SEYMOUR, *deceased.*

Witnesses as to JAMES B. SHARP:
J. F. WILLIAMS,
J. NORTON WILLIAMS.

Witnesses as to WILLIAM SEYMOUR:
FRANCIS LARKIN,
EDWARD WELLS.